Figure 2:
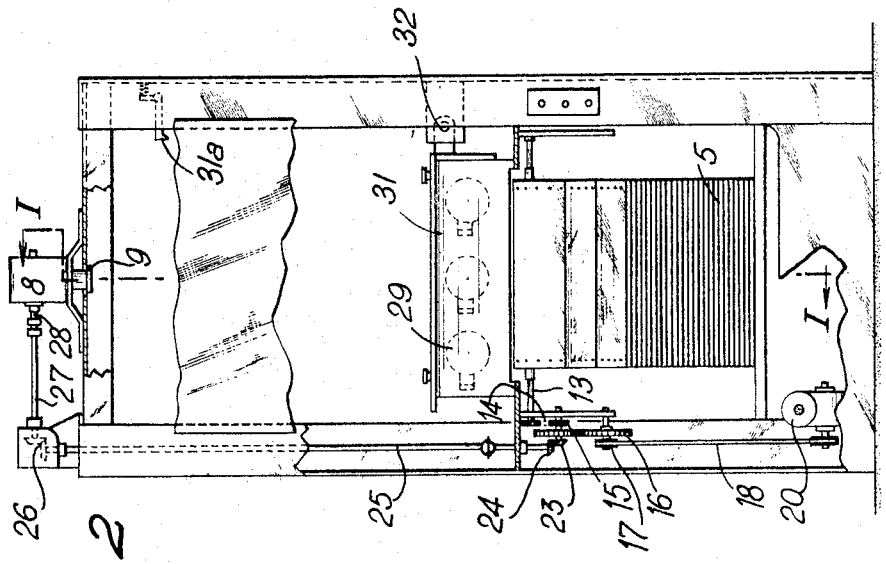

Dec. 6, 1966  G. R. DARTHENAY  3,289,529
APPARATUS FOR REPRODUCING CONTINUOUSLY MOVING DOCUMENTS
Filed July 24, 1963

United States Patent Office 3,289,529
Patented Dec. 6, 1966

3,289,529
APPARATUS FOR REPRODUCING CONTINUOUSLY MOVING DOCUMENTS
Georges René Darthenay, Paris, France, assignor to Robert Albert Antoine Darthenay, Versailles, Seine-et-Oise, France
Filed July 24, 1963, Ser. No. 297,368
Claims priority, application France, July 26, 1962, 905,119, Patent 1,338,426
7 Claims. (Cl. 88—24)

Automatic accounting or data processing machines used in punched card or electrical systems usually operate on documents in the form of continuous strips, and such documents are generally accordion folded to facilitate storage and transport.

It is virtually mandatory for such documents to comprise several thicknesses, including one or more carbon sheets to permit distribution of copies and filing of documents required for records.

These documents, together with their carbon reproducers, are costlier than single thickness documents. In addition, the volume of records made up of full size documents can become very considerable. The object of this invention is to overcome the aforementioned drawbacks in processing methods resorted to heretofore, on documents of this type.

The invention accordingly has for one of its objects to provide a device in which there is caused to travel, one on each side of a size-reducing optical system, a document to be processed and a sensitive photographic surface, respectively, the respective travelling speeds of which are constant and bear the same ratio to each other as the ratio of the distance between the document and the optical system to the distance between the optical system and the sensitive surface.

Such an arrangement greatly simplifies the photographic equipment and permits high reproduction speeds without detrimental effect on the quality of the image, which image can subsequently be viewed by direct vision in a reading device, or in any other convenient means of reproduction, while at the same time reducing the space required for the records to that needed for storing films.

In most cases, documents issuing from tabulators do so in continuous accordion folded shape, and since subsequent exploitation requires that such documents be separated by cutting on an associated apparatus, such as a trimmer, one of the preferred ways of performing the method as hereinbefore described consists of associating with the aforementioned photographic operations the cutting operations, which are carried out immediately after the photographic reproduction operations.

When safety requires it, the commencement of exploitation proper (the initial phase of which is the cutting process) is preceded by multiple photographic operations repeated at least once each, in order to guard against possible accidents affecting the photographic film during developing and printing operations, or else in order to provide multiple records in whole or in part, of the documents in question.

The apparatus of the present invention is characterized in that it includes guiding means for the strip documents, means for advancing the strip and, positioned remotely, at least one photographic chamber with an open lens within which is disposed means for continuously advancing a photographic film, the means for advancing the strip and the means for advancing the film being interconnected by a common slip-free positive transmission, the entire assembly being positioned ahead of the exploitation means, and preferably ahead of a trimmer.

The description which follows with reference to the accompanying drawing, which is filed by way of non-limitative example, will give a clear understanding of how the invention can be carried into practice.

Figure 1:
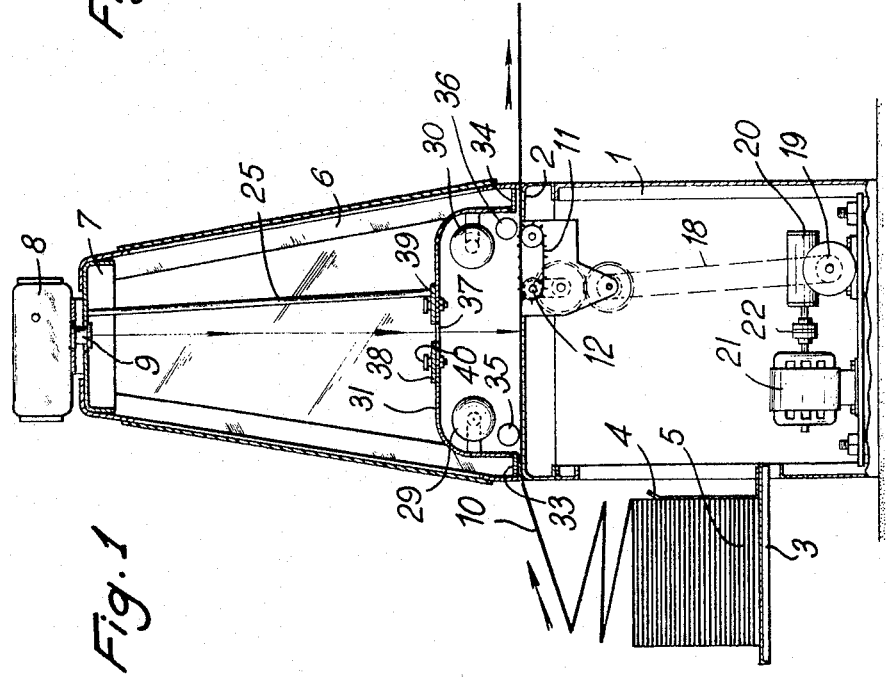

Referring to the drawing filed herewith:

FIG. 1 is a longitudinal section as taken along lines I—I in FIG. 2 of the reproducing apparatus; and FIG. 2 shows in front elevation the said reproducing apparatus, with partial cutaway to reveal the mechanism thereof.

Referring to the accompanying drawing, therein is shown an apparatus consisting of a base 1 supporting a platen 2 with rounded edges. On one side, said base supports a ledge 3 having a back 4 on which a stack of accordion folded documents 5 can be placed. On each side of the platen, above the same, base 1 is provided with a prism-shaped structure 6, at the truncated apex of which is disposed a support 7 for a photographic chamber 8 having a lens 9 the aperture of which is directed towards the platen 2. The structure 6 has its faces covered with opaque removable sheeting forming doors for instance, whereby to protect the lens, which is normally always open, from undesired environmental light, said sheeting being shown partially broken away in FIG. 2.

The continuous sheet 10 of documents to be reproduced runs in unfolded state over platen 2, entering from the side of stack 5 and issuing from the other side.

The sheet is pulled along by lateral caterpillar tracks 11 provided with upstanding points, each caterpillar being associated with a driving sprocket and both sprockets being rigid with a common shaft 13. On one end of shaft 13 is mounted a chain-sprocket driven by a chain 14 and the take-off gearwheel 15 of a reduction gear 16 of which the input gearwheel is rigid with a pulley 17 over which runs a driving belt 18 which also runs over an output pulley 19 of a reduction unit 20 affixed to the bottom of base 1. The input shaft of reduction unit 20 is connected to the shaft of a motor 21, with an electromagnetic brake-clutch 22 interposed therebetween.

The reduction gear output shaft with which sprocket 15 is rigid is also keyed to a bevel pinion 23 which meshes with a companion pinion 24 mounted on the end of a countershaft 25, and this shaft drives through a bevel gear coupling 26 a shaft 27 coupled to the control shaft 28 of the camera 8.

In this manner the motion of caterpillars 11 and hence of the strip 10, as well as that of the film in the camera 8, are positively interconnected in slip-free fashion in a drive ratio equal to the ratio of the distance between strip 10 and lens 9 to the distance between lens 9 and the film. As the documents 10 run over platen 2 at a predetermined speed, the film unwinds in the camera at a corresponding speed such that the image of any point on document 10 remains stationary on the moving film for the duration of the exposure time.

Such exposure is achieved by illuminating the strip of documents 10 flattened on platen 2 by means of two banks 29 and 30 of light sources such as electric bulbs, said banks being arranged in lines perpendicular to the direction of travel of strip 10.

Said two banks are positioned above platen 2, beneath an enclosure 31 pivotally connected at 32 whereby to enable it to be raised to permit disengagement of platen 2. Said enclosure is open on the side facing the upper face of the platen and is provided with transverse flanges 33 and 34 positioned just above said platen whereby to leave narrow slits for passage of strip 10. In the open side of the enclosure are disposed pressure rolls 35 and 36 projecting slightly beneath said opening for maintaining the strip 10 taut and flat, pressure roll 36 being disposed opposite the sprockets of caterpillars 11.

The upper middle part of enclosure 31 is provided with a wide transverse slit 37 the lips of which can be adjustably covered by sliding blades 38 and 39 which are adapted to be secured by means of milled nuts 40. This arrangement permits of providing a relatively thin adjustable slit from which issue, after reflection on the documents of strip 10, the light rays which then reach the lens 9 and the photosensitive film of camera 8, thereby determining the exposure time.

At the exit end from platen 2 strip 10 can be returned into a box-like magazine within which the accordion type of folding can be reformed whereby to obtain a stack similar to stack 5. If will, however, be appreciated that the strip 10 can, on the exit side of the platen, pass through any other utilization apparatus of the documents, such as a trimmer.

Such a trimmer could likewise be provided with means for positive entrainment of the paper, while, a three-blade unit permits of sectioning the paper by the drop of a guillotine blade straddling each fold of the strip, in conjunction with a well known controlled feed means of the paper for determining the cutting time by any convenient known means, such as a photoelectric detector cooperating with any convenient marking on the document or a feeler which rubs against the paper but touches the strip-supporting platen through each hole provided in said strip at suitable places.

Thus, it will be understood that with such a disposition, photographic reproduction can be achieved, after adjustment of blades 38 and 39, without a shutter or a Geneva mechanism, with a constant aperture of lens 9, and without any halts. The luminosity of the banks 29 and 30 is preferably adjusted by controlling the feed current, for instance by means of a rheostat. This also applies to the rotation speed of motor 21.

In the event that motion of strip 10 is arrested accidentally, then in order to avoid over-exposure which would result in an unreadable strip being obtained of a width corresponding to that of the image of the slit on the photographic film, the feed circuit to said banks can be opened by a switch (not shown), which at the same time causes instant locking of the transmission by releasing the clutch 22 and applying the corresponding brake, thereby causing the caterpillar drive and the film to stop also. Such a switch would be controlled by a friction roller riding on the strip 10.

Alternatively, upon the elements hereinbefore described could be superimposed the action of a bimetallic strip type shutter which is tripped in the camera by halting of the film and which closes the dark chamber and prevents unwanted exposures resulting, say, from the surrounding illumination when the sheeting is opened, or by the operator's hands correcting defects, and the like.

It is possible, independently of the drawbacks stemming from accidental stoppages, to avoid in a simple way those due to intentional stoppages. Accordingly, a monitoring device, which likewise utilizes a photoelectric detector which cooperates with any convenient marking on the document or a feeler type detector which touches the paper but touches the platen only when one of the holes of a series thereof provided in a systematic way on the paper moves opposite said feeler, is designed in such manner that the corresponding action of detection can take place only when a fold in the strip is positioned opposite the slit between blades 38 and 39. Said detector causes an intermediate relay to operate which normally prevents stoppage of the machine but which permits it when the fold in question is opposite the slit, while at the same time causing the electromagnetic brake to be applied where required. It is unnecessary to shut the camera or extinguish the light banks if the halt is an intentional one, made for the purpose of supplying paper for instance, or for any other reason, since the black strip which will appear on the film as a result of such a stop will coincide with an area of the photographed documents that is not utilized, which in this specific case would be of the fold separating two successive documents.

It is to be noted that the same detector designed as hereinbefore defined could serve both the reproduction system and the trimmer or other utilization apparatus.

In addition, in order to further improve reliability, the camera is provided with means for stopping the machine at the end of the film, or when accidental film crowding or rupturing occurs. Such a camera could moreover be provided with an incorporated photoelectric cell for automatically adjusting in a well known manner a diaphragm in the lens unit according to the degree of illumination of the object to be photographed. When it is necessary to open the apparatus in order to insert a strip 10, the enclosure 31 is raised and can be retained in that position by a hook 31a after the sheeting has been removed.

The disposition hereinbefore described permits systematic microphotography of single documents in continuous strip form, prior to exploitation. Should safety reasons dictate it, in order to obviate possible accidents during loading, unloading, development and possible printing of a unique film, particularly when such accidents are irreparable once the exploited documents have been dispersed, the said apparatus can be duplicated whereby to obtain two films, and such duplication can be confined to the use of two or more cameras.

The use of two or more cameras also permits, by means of separators such as prisms for instance, of assigning certain of the cameras to predetermined areas of the documents to be reproduced, in order to meet subsequent separate exploitation needs.

It goes without saying that many modifications can be made to the specific embodiments hereinbefore described, without departing from the spirit and scope of the invention.

What I claim is:

1. Apparatus for reproducing documents in continuous strip form, comprising, in combination, means for positively guiding and advancing continuous strip documents, at least one photographic chamber positioned remotely with respect to the path of travel of said strip documents, shutterless camera means with an open lens within said chamber and operatively positioned with respect to the path of travel of said strip documents to view the same, means in said chamber for advancing photographic film continuously therein, to receive an image from said open lens, a common slip-free positive transmission interconnecting said means which advances the strip and the means for advancing the film to correlate the advancement of the strip and the film, a supporting platen for said strip documents, an adjustable slit mask above said platen between the latter and the chamber for the passage of the image from said strip documents to said lens, and illuminating means within said mask extending parallel with said slit and concealed from said lens by said mask.

2. Apparatus according to claim 1, comprising retraction means operatively associated with said mask.

3. Apparatus according to claim 1, comprising rolls within said mask for engaging said strip to hold the same taut.

4. Apparatus according to claim 1, comprising removable opaque sheeting between the strip-supporting platen and the lens.

5. Apparatus according to claim 2, wherein said retraction means comprises means hingeably supporting the mask to enable movement away from the platen.

6. Apparatus according to claim 5, comprising rolls within the mask for engaging the strip to hold the same taut, said mask in operative position resting on said rolls and being supported thereby.

7. Apparatus according to claim 6, wherein said mask and said platen define entry and exit slots for the continuous strip documents.

References Cited by the Examiner
UNITED STATES PATENTS

| | | | |
|---|---|---|---|
| 1,786,220 | 12/1930 | Owens | 88—24 |
| 2,953,061 | 9/1960 | Pfaff | 88—24 |
| 3,076,392 | 2/1963 | Cerasani et al. | 88—24 |

NORTON ANSHER, *Primary Examiner.*

RICHARD A. WINTERCORN, *Assistant Examiner.*